INVENTOR
HERMANN GROS
BY
ATTORNEY

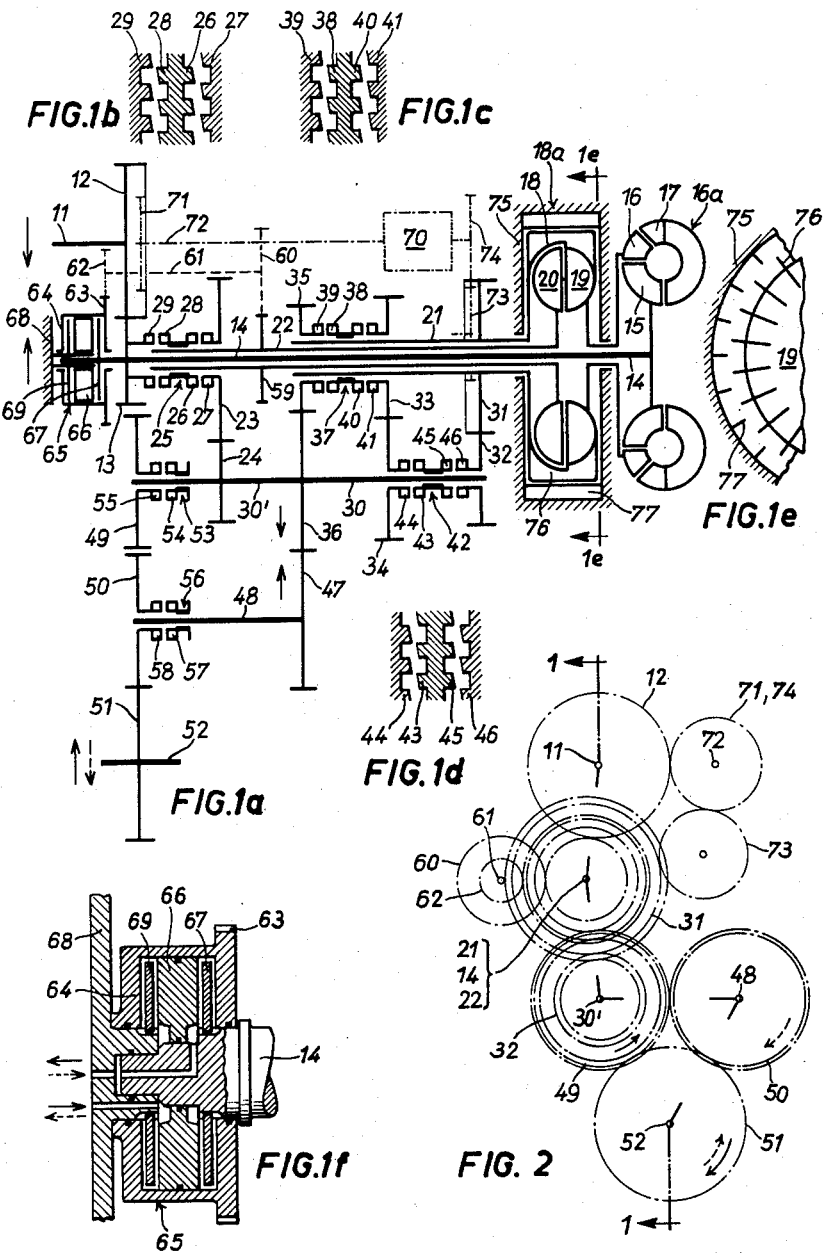

United States Patent Office 3,159,054
Patented Dec. 1, 1964

3,159,054
HYDROMECHANICAL COMPOUND TRANSMISSION WITH REVERSING GEAR MEANS
Hermann Gros, Friedrichshafen, Germany, assignor to Maybach-Motorenbau G.m.b.H., Friedrichshafen, Germany, a firm of Germany
Filed Aug. 6, 1962, Ser. No. 214,910
Claims priority, application Germany, Sept. 2, 1961, M 50,205
17 Claims. (Cl. 74—732)

This invention relates to improvements in hydromechanical compound transmissions for transmitting mechanical power from one shaft to another in which a chargeable and dischargeable torque converter known as a Foettinger unit is used.

A hydromechanical compound transmission using a chargeable and dischargeable torque converter and clutch followed by speed change gears is known, particularly for use with railroad cars driven by diesel engines. In one known transmission, the diesel engine drives the converter turbine wheel through a speed step-up gear train and the converter turbine wheel drives a three-speed change gear arrangement. In this three-speed change gear arrangement, the converter turbine wheel drives a first and second gear train through a first gear shaft while a third gear train is driven through the fluid drive of a hydraulic torque converter. The fluid drive for the third gear train forms the gear shift clutch for the third gear train and also serves to equalize the speed of the first and second gear trains for shifting by claw clutches. The first gear shaft carries the first gear wheel of the first and second speed change gear trains. The first wheel of the third speed change gear train is carried on a hollow shaft driven by the turbine wheel of the hydraulic clutch. The second wheels of the gear wheel trains and a claw clutch for shifting the first and second speed change gear trains are arranged on a second shaft which is the driven gear shaft. During the shifting of the first and second gear trains, a lower torque is transmitted over the hydraulic clutch and the third gear wheel train to the driven shaft whereby the torque transmitted is lowered but not interrupted.

The present invention relates to an improved hydromechanical compound transmission having a compact and space-saving construction achieved by providing the following features:

(a) The hydraulic unit is arranged on the side of the transmission opposite to the driving engine.

(b) The component parts of the transmission are arranged in the following order: drive shaft, bypass drive, change-speed gear, and hydraulic clutch and converter.

(c) The transmission comprises a first set of shafts consisting of three shafts arranged concentrically wherein the inner shaft extends from the driving side of the transmission through the transmission to the converter on the other side of the transmission to drive the converter pump wheel. The outer hollow shaft is connected to the converter turbine wheel through a clutch housing serving as a clutch blade wheel. The outer hollow shaft also serves as a speed change gear primary shaft and carries the first gear wheels of the speed change gear trains. The inner hollow shaft or clutch shaft is arranged between the two above-mentioned shafts and connects the second clutch blade wheel with the first gear wheel of the bypass drive.

(d) A second gear shaft is provided for carrying the second gear wheels of the speed change gear trains and the second gear wheel of the bypass drive.

The transmission according to the present invention differs from known transmissions in that the pump wheel and the turbine wheel of the hydraulic torque converter cannot be connected with each other by a clutch. A bypass gear train connected with the hydraulic cluch does not form a clutch train as in known transmissions but serves for synchronization, for transmitting the torque during the shifting of the claw clutches of the change-speed gear means, and also for braking.

The arrangement of the change-speed gear between the hydraulic drive unit and the bypass drive, and the arrangement of the three concentric shafts, according to the invention, make it possible to connect the clutch shaft either with the first gear wheel of the bypass gear wheel train or with the converter pump wheel shaft by means of a change-over clutch. Thus, in contrast to known transmissions, three speeds can be obtained not only through the converter but also through the clutch. Thereby, the range of use of a rail vehicle equipped with the transmission according to the invention is considerably increased.

The clutches for shifting from the converter to the hydraulic clutch are preferably designed as alternately connectable double claw clutches having claws having rejecting faces inclined in one direction of rotation of the clutch.

In order to avoid influencing the operation of the diesel engine when the position of the double claw change-over clutch is changed and to permit faster shifting of the double claw change-over clutch, synchronizing means is preferably arranged between the converter pump wheel shaft and the clutch shaft. A friction clutch connects the clutch shaft with the converter pump wheel shaft for accelerating the clutch shaft and with a fixed part of the transmission, for example the transmission housing, for retarding the clutch shaft.

In an embodiment of the invention only the gear wheel train for second speed of the three gear wheel trains in the three-speed change gear means consists of two gear wheels which are rotatable relative to the shafts carrying the gear wheels. This gear wheel train is arranged between the other two gear wheel trains of the three-speed change gear means.

The other two gear trains each consist of a gear wheel rotatable on its shaft and a gear wheel fixed for rotation with the shaft on which it is carried. Of these latter two gear wheels, one is carried for rotation with the primary shaft of the three-speed change gear means and the other is carried for rotation with the second shaft of the three-speed change gear means.

For shifting the gear wheel trains of the three-speed change gear means, a double claw clutch having teeth with rejecting faces inclined in one direction of rotation is arranged about the primary shaft of the three-speed change gear means between the second gear wheel train and one of the other two gear wheel trains and a second double claw clutch is arranged about the second shaft between the second gear wheel train and the other of the said two gear wheel trains.

This arrangement of the gear wheel trains of the three-speed change gear means and the two double claw clutches has the advantage that the shifting from one gear into the next gear can be accomplished by shifing only one of the two double claw clutches from one shifting position to another shifting position without an intermediate idle running position. This affords a simple design of the shifting device.

In the combination of the compound transmission arrangement followed by a reversing gear to form a unit, the secondary shaft is preferably extended to form one direction of rotation shaft. A gear wheel on the end of this directional shaft drives another gear wheel connected to the end of the shaft for the opposite direction of rotation. Reversing gear wheels forming part of reversing gear means can be alternately coupled with the two directional shafts, for example by claw clutches. These reversing gear wheels mesh with a driven gear mounted for rotation with the driven shaft.

The customary speed increasing gear wheel train between the diesel engine and the converter pump wheel shaft which permits making the hydraulic torque converter as small as possible, can be compactly accommodated, together with the reversing gear wheels of the reversing means, in a generally vertical traverse plane of the transmission.

The driving shaft, the primary gear shaft and the secondary shaft may be arranged in a generally vertical plane extending longitudinally of the transmission. The secondary shaft, third gear shaft and the two directional shafts are arranged in a horizontal plane. With this arrangement of shafts, a low position of the driven or output shaft and the gear wheel thereon is obtained which is desirable for driving one or more drive shafts since it eliminates the requirement for an intermediate gear and gear shaft.

The known arrangement of the hydraulic clutch in a housing formed of one blade wheel has the advantage that the latter can be arranged in a chargeable and dischargeable container and provided with outer blades which cooperate with blades on the walls of the container to form a hydraulic brake.

The novel features which are considered characteristic of the invention are set forth with particularity in the appended claims. The invention itself, however, and additional objects and advantages thereof will best be understood from the following description of an embodiment thereof when read in connection with the accompanying drawing wherein:

FIG. 1a is a schematic vertical sectional view of a hydromechanical transmission according to the present invention, taken along line 1—1 of FIG. 2.

FIGS. 1b, 1c, and 1d are partial schematic detail views of the double claw clutches shown in FIG. 1a.

FIG. 1e is a schematic cross-sectional view along line 1e—1e of FIG. 1a of a hydraulic brake forming part of the transmission shown in FIG. 1a.

FIG. 1f is a schematic longitudinal sectional view of a double friction clutch forming part of the transmission shown in FIG. 1a.

FIG. 2 is a schematic end view of the hydromechanical transmission according to the present invention.

Figure 3:
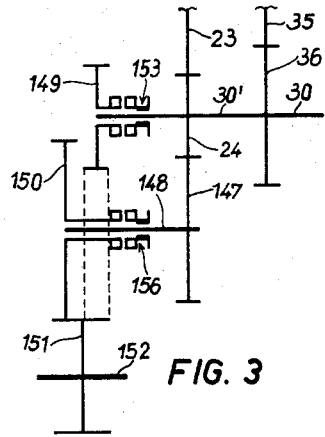
FIG. 3 is a schematic side view of a modified reversing gear taken along the line 3—3 of FIG. 4.

FIGS. 1a, 1b, 1c, 1d, 1e, 1f and 2 shown schematically an embodiment of the present invention in which a three-speed change gear means and reversing gear means are provided.

In FIG. 1a a drive shaft 11, which is connected to a diesel engine (not shown), drives a speed step-up gear train consisting of the gears 12 and 13. The gear train 12, 13 is adapted to drive a primary shaft 14 at an increased speed. The gear train 12, 13 is arranged on the driving side of the transmission while the shaft 14 extends through the transmission to the opposite side to a hydraulic drive unit of the Foettinger type consisting of a hydraulic torque converter 16a and a hydraulic clutch 18a. The torque converter 16a consists of a pump wheel 15 driven by the shaft 14, a turbine wheel 16, and a guide wheel 17. The converter turbine wheel 16 is connected through a clutch housing element 18 of the hydraulic clutch 18a to an outer hollow shaft 21 arranged concentrically with the shaft 14. The outer hollow shaft 21 is the primary shaft of the three-speed change gear means. The clutch housing element 18 carries a blade wheel 19 of the hydraulic clutch while a second blade wheel 20 of the hydraulic clutch is carried by a hollow clutch shaft 22 arranged concentrically between the shaft 14 and the hollow shaft 21. Arranged for rotation about the clutch shaft 22 is a gear wheel 23 of a bypass drive means consisting of gear wheels 23 and 24. A change-over or double claw clutch 25 having mating claws 26, 27 and 28, 29 is also arranged about the clutch shaft 22. By means of the double claw clutch 25, the clutch shaft 22 can be connected for rotation with the bypass gear wheel 23 or with the shaft 14.

The three-speed change gear means consists of three gear wheel trains, each gear wheel train having a first gear wheel arranged about hollow shaft 21 and a second gear wheel arranged about a secondary shaft 30. The third gear wheel train consists of a gear wheel 31 fixed for rotation with the hollow shaft 21 and a gear wheel 32 mounted for rotation about the secondary shaft 30. The second gear wheel train consists of gear wheels 33 and 34, each mounted for rotation about the shafts 21 and 30, respectively. The first gear wheel train consists of a gear wheel 35 mounted for rotation about the hollow shaft 21 and a gear wheel 36 fixed for rotation with the shaft 30.

The gear wheels 35 and 33 of the first and second gear wheel trains, respectively, may be alternately coupled with the hollow shaft 21 by means of a double claw clutch 37. The latter has mating claws 38, 39 and 40, 41 having teeth with inclined front faces as shown in FIG. 1c. The gear wheels 34 and 32 of the second and third gear wheel trains, respectively, may be alternately coupled with the secondary shaft 30 by means of a double claw clutch 42 having mating claws 43, 44 and 45, 46 as shown in FIG. 1d. The arrangement of the three gear wheel trains and the two double claw clutches 37, 42 is such that double shifting during synchronization is avoided. The double claw clutches 37, 42 have only two engaging positions each, without an intermediate idle position. As a result, the shifting device may be made of a simple design.

The secondary shaft 30 is extended in one direction to form a directional shaft 30' of the reversing gear means. In the reversing gear means the gear wheel 36 of the first gear wheel train 35, 36 is carried on the directional shaft 30', serves as a directional gear wheel, and meshes with a directional gear wheel 47 of equal size carried on another directional shaft 48. Rotatably mounted at the ends of the shafts 30' and 48 are reversing gear wheels 49 and 50, respectively. These reversing gear wheels 49 and 50 each mesh with a driven gear wheel 51 mounted for rotation with a driven gear shaft 52. Means are provided to alternately couple the reversing gear wheel 49 to the shaft 30', or to couple the reversing gear wheel 50 to the shaft 48 when the vehicle on which the transmission is installed is not in motion. This means consists of clutches 53 and 56 having mating claws 54, 55 for engaging the gear wheel 49 to the shaft 30' and mating claws 57, 58 for engaging the gear wheel 50 to the shaft 48, respectively.

Synchronizing means are provided between the torque converter pump wheel shaft 14 and the clutch shaft 22. The synchronizing means comprises a gear wheel 59 carried on the clutch shaft 22. This gear wheel 59 meshes with a gear wheel 60 carried on one end of a shaft 61. At the other end of the shaft 61 is a gear wheel 62 which meshes with a gear wheel 63. Secured on the gear wheel 63 is a housing 64 of a double friction clutch 65. The clutch 65 is actuated by a fluid medium supplied under pressure. The clutch housing 64 forms a cylinder containing a pressure fluid operated piston 66 which acts as a clutch pressure plate to press a clutch disc 67 connected for rotation with the converter pump wheel shaft 14, against a friction surface on the right hand wall of the clutch housing 64 for accelerating the clutch shaft 22. For slowing down the rotational speed of the clutch shaft 22, the piston 66 presses a clutch disc 69, which is non-rotatably fixed to the transmission casing 68, against a friction surface on the left hand wall of the clutch housing 64 (FIGS. 1a and 1f).

For shifting the gears of the three-speed change gear means, a shift device comprising a regulator 70 indicated schematically by broken lines in FIG. 1a, is provided. The regulator 70 controls the shifting device in response to the primary and secondary speed of the hydraulic torque converter 16a. The primary speed is transmitted to the regulator 70 from the gear wheel 12 on the drive shaft 11 by means of a gear wheel 71 and a shaft 72. The secondary speed is transmitted to the regulator 70 from the gear wheel 31 of the third gear wheel train by means of gear wheels 73 and 74.

The transmission shown in FIGS. 1a and 2 operates as follows:

The primary shaft 11 drives the torque converter pump wheel 15 through the gear train 12, 13 and the shaft 14. The converter turbine wheel 16 transmits secondary torque through the clutch housing element 18 to the primary shaft 21 of the speed change gear means. The power transmitted, as determined by the shifting device 70, passes through the shaft 21 and through one of the three gear wheel trains of the three-speed change gear means to the secondary shaft 30. For the first gear wheel train, the power is transmitted through the engaged claws 38, 39 of clutch 37 and the gear wheels 35, 36; for the second gear wheel train, power is transmitted through the engaged claws 40, 41 of clutch 37, the gear wheels 33, 34, and the engaged claws 43, 44 of clutch 42; and for the third gear wheel train, power is transmitted through the engaged claws 45, 46 of clutch 42 and the gear wheels 31, 32.

When the first gear wheel train is operating, both claw clutches 37 and 42 are shifted to the left; when the second gear wheel train is operating, the claw clutch 37 is shifted to the right and the claw clutch 42 is shifted to the left; and when the third gear wheel train is operating, both claw clutches 37 and 42 are shifted to the right. With this arrangement only one of the two double claw clutches, 37 or 42, has to be moved with each shifting of the three-speed change gear means.

When shifting from one gear wheel train to another, the hydraulic clutch 18a is filled with operating fluid and the torque is transmitted through the engaged claws 26, 27 of the claw clutch 25, and through the by-pass drive 23, 24 to the extension of the shaft 30. The engaged clutch 37 or 42 is thus relieved and can be disengaged. When shifting into high speed positions, the claw clutches 37 or 42 are synchronized by the filled hydraulic clutch 18a and the by-pass drive 23, 24 to facilitate the shifting of the claw clutch 37 or 42 to the next shifting position. When shifting back to lower speed positions, the hydraulic clutch 18a is emptied after the claw clutch 26, 27 has been disengaged and the claw clutch 37 or 42 is synchronized by the converter 16a for shifting into the next shifting position.

The individual three speed change gear trains can also be operated by the hydraulic clutch 18a with the torque converter 16a empty. To this end the claws 26, 27 of clutch 25 are disengaged and claws 28, 29 are engaged. Synchronization is provided by the mechanism 59–69. The power is now transmitted as follows: drive shaft 11, gear train 12, 13, clutch claws 28, 29, hydraulic clutch shaft 22, blade wheel 20 (now acting as a pump wheel), blade wheel 19 (now acting as a turbine wheel) of the hydraulic clutch 18a, hollow shaft 21, and one of the three-speed change gear trains 31, 32 or 33, 34 or 35, 36.

The arrows next to the gear wheels in FIGS. 1a and 2 represent the direction of rotation of these gear wheels, the solid arrows indicating one rotational direction and the dotted arrows indicating an opposite rotational direction. When a vehicle, such as a railroad car, is traveling in one direction, the driven gear wheel 51 rotates in the direction of the solid arrow. When the vehicle is traveling in the opposite direction, the gear wheel 51 rotates in the direction of the dotted arrow. The direction of rotation of gear wheel 51 will depend on which of the clutches 53 or 56 is engaged. The clutch 53 or 56 is shifted when the vehicle is at a standstill.

It is also possible to use the transmission for braking by shifting one of the three-speed change gear trains corresponding to the driving speed and by filling the hydraulic clutch 18a. The converter 16a can also be used for producing a braking effect.

If additional braking means are desired, a container 75 provided around the hydraulic clutch 18a may be filled with a fluid. This additional braking effect is obtained by blade elements 76 provided on the outside of the housing 18 of the hydraulic clutch 18a which cooperate with blade elements 77 on the inside of the container 75.

Figure 4:
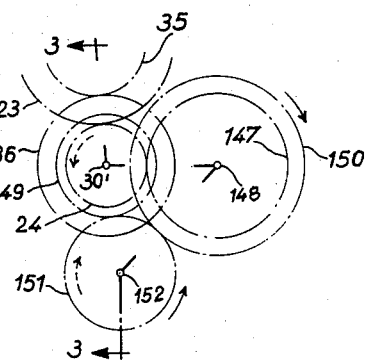
FIG. 4 is a schematic end view of the reversing gear shown in FIG. 3.

FIGS. 3 and 4 show a modification of the reversing gear means.

As in the embodiment of FIG. 1a, a secondary gear shaft 30 is extended to form a directional shaft 30' of the reversing gear means. According to the embodiment of FIGS. 3 and 4, a directional gear wheel 147 on a second directional shaft 148 meshes with the gear wheel 24 of the by-pass drive. The gear wheel 24 is mounted for rotation with the directional shaft 30'. Two reversing gear wheels 149 and 150 are rotatably mounted on the ends of the two directional shafts 30' and 148, respectively. These reversing gear wheels 149 and 150 each mesh with the gear wheel 151 mounted for rotation with a driven shaft 152. Means are provided to alternately couple reversing gear wheel 149 to the shaft 30' or to couple the reversing gear wheel 150 to the shaft 148 when the vehicle is not in motion. These means consist of clutches 153 and 156 for engaging the gear wheel 149 to the shaft 30' and the wheel 150 to the shaft 148, respectively. In order to avoid the use of small diameter reversing gear wheels having poor engaging qualities, the gear wheel 147, mounted for rotation with the shaft 148, is made larger than the gear wheel 24 of the by-pass drive. The by-pass gear wheel 24, which is mounted for rotation with the shaft 30', meshes with the gear wheel 147.

In order to obtain equal speeds of the shaft 152 in both directions of travel of the vehicle, the ratio of transmission through both gear trains 24, 147 and 150, 151 is approximately equal to the ratio of transmission through the gear train 149, 151.

Figure 5:
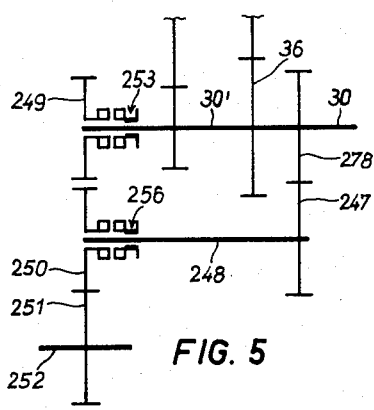
FIG. 5 is a schematic side view of a further modification of the reversing gear means taken along the line 5—5 of FIG. 6.
Figure 6:
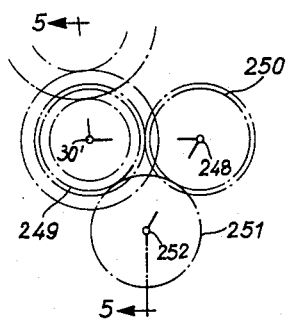
FIG. 6 is a schematic end view of the reversing gear means shown in FIG. 5.

FIGS. 5 and 6 show a third modification of the reversing gear means. In this modification an additional separate gear wheel 278 is mounted for rotation with the shaft 30. The additional gear wheel 278 meshes with a gear wheel 247, both gear wheels 247 and 278 being of approximately the same diameter. The gear wheel 247 is mounted for rotation with the second directional shaft 248. The remaining parts of the reversing gear of FIGS. 5 and 6 correspond to the arrangement described in FIGS. 1a and 2.

The embodiment of the reversing gear means according to FIGS. 3 to 6 permits different distances between the centers of the reversing gear shafts 30', 148 and 30', 248 and different positions of the driven shafts 152, 252.

If the feature of shifting the three-speed change gear trains through the Foettinger clutch 18a is not desired, the transmission may be constructed without the double claw clutch 25 and without the synchronizing means 59–69. In such a case, the gear wheel 23 of the by-pass drive is mounted for rotation with the clutch shaft 22.

I claim:

1. A hydromechanical change speed transmission particularly for diesel engine powered rail vehicles comprising, in combination:

a drive gear at one side of the transmission, a hydraulic torque converter and a hydraulic clutch operatively connected to said torque converter and forming a unit therewith placed on the opposite side of the transmission, said torque converter and said hydraulic clutch being capable of being filled with and relieved from an operating fluid, said torque converter including a pump wheel and a turbine wheel, said hydraulic clutch including a rotatable housing forming a first blade wheel and being connected for rotation with said turbine wheel, and a second blade wheel, a primary shaft extending through the transmission and operatively connecting said drive gear to said pump wheel for driving said pump wheel, a first hollow shaft coaxial of said primary shaft and connected to said first blade wheel for rotation therewith, speed change gear means having a plurality of gear trains, said gear trains each having first and second gear wheels, said first gear wheels of said gear trains being carried on said first hollow shaft, said speed change gear means including a plurality of mechanical clutches so constructed and arranged that only one of said gear trains is capable of transmitting torque at a time, depending on the position of said mechanical clutches, torque bypass means having a first gear wheel, and a second gear wheel engaged by said first gear wheel, a second hollow shaft coaxial of said primary shaft and having a portion interposed between said primary shaft and said first hollow shaft, said second hollow shaft being connected to said second blade wheel of said hydraulic clutch for rotation therewith, said first gear wheel of said torque bypass means being carried on said second hollow shaft, means constructed and arranged to connect said first gear wheel of said bypass means to said second hollow shaft for rotation therewith, and a secondary shaft placed parallel to said primary shaft and carrying the second gear wheels of said plurality of gear trains, said second gear wheel of said bypass means being connected to said secondary shaft for rotation therewith, said torque bypass means being placed next to said drive gear, said speed change gear means being placed next to said bypass means, and said hydraulic clutch being placed between said speed change gear means and said torque converter.

2. A change speed transmission as defined in claim 1 wherein said means for temporarily connecting said first gear wheel of said bypass means to said second hollow shaft is in the form of a change-over clutch for selectively connecting either said first gear wheel of said bypass means or said primary shaft to said second hollow shaft.

3. A change speed transmission according to claim 2 wherein said change-over clutch is a double claw clutch having claws having rejecting faces inclined in one direction of rotation of the clutches.

4. A hydromechanical change speed transmission particularly for diesel engine powered rail vehicles comprising, in combination:

a drive gear at one side of the transmission, a hydraulic torque converter and a hydraulic clutch operatively connected to said torque converter and forming a unit therewith placed on the opposite side of the transmission, said torque converter and said hydraulic clutch being capable of being filled with and relieved from an operating fluid, said torque converter including a pump wheel and a turbine wheel, said hydraulic clutch including a rotatable housing forming a first blade wheel and being connected for rotation with said turbine wheel, and a second blade wheel, a primary shaft extending through the transmission and operatively connecting said drive gear to said pump wheel for driving said pump wheel, a first hollow shaft coaxial of said primary shaft and connected to said first blade wheel for rotation therewith, speed change gear means having a plurality of gear trains, said gear trains each having first and second gear wheels, said first gear wheels of said gear trains being carried on said first hollow shaft, said speed change gear means including a plurality of mechanical clutches so constructed and arranged that only one of said gear trains is capable of transmitting torque at a time, depending on the position of said mechanical clutches, torque bypass means having a first gear wheel, and a second gear wheel engaged by said first gear wheel, a second hollow shaft coaxial of said primary shaft and having a portion interposed between said primary shaft and said first hollow shaft, said second hollow shaft being connected to said second blade wheel of said hydraulic clutch for rotation therewith, said first gear wheel of said torque bypass means being carried on said second hollow shaft, means constructed and arranged to connect said first gear wheel of said bypass means to said second hollow shaft for rotation therewith, a secondary shaft placed parallel to said primary shaft and carrying the second gear wheels of said plurality of gear trains, said second gear wheel of said bypass means being connected to said secondary shaft for rotation therewith, said torque bypass means being placed next to said drive gear, said speed change gear means being placed next to said bypass means, and said hydraulic clutch being placed between said speed change gear means and said torque converter, and synchronizing means interposed between said primary shaft and said second hollow shaft, said synchronizing means including a stationary element and a friction clutch having a member operatively connected to said second hollow shaft for rotation therewith and means for frictionally connecting said primary shaft to said member for increasing the rotational speed of said second hollow shaft and for alternately frictionally connecting said member to said stationary element for retarding the rotational speed of said second hollow shaft.

5. A hydromechanical change speed transmissiion particularly for diesel engine powered rail vehicles comprising in combination:

a drive gear at one side of the transmission, a hydraulic torque converter and a hydraulic clutch operatively connected to said torque converter and forming a unit therewith placed on the opposite side of the transmission, said torque converter and said hydraulic clutch being capable of being filled with and relieved from an operating fluid, said torque converter including a pump wheel and a turbine wheel, said hydraulic clutch including a rotatable housing forming a first blade wheel and being connected for rotation with said turbine wheel, and a second blade wheel, a primary shaft extending through the transmission and operatively connecting said drive gear to said pump wheel for driving said pump wheel, a first hollow shaft coaxial of said primary shaft and connected to said first blade wheel for rotation therewith, a three-speed change speed gear having three gear trains, each of said gear trains having a first and a second gear wheel, the gear train for second speed being placed between the gear trains for first and third speed, the first gear wheel of the gear train for second speed being rotatable on said first hollow shaft, a secondary shaft placed parallel to said primary shaft, the second gear wheel of the gear train for second speed being rotatable on said secondary shaft, said first gear wheels of the gear trains for first and third speed being carried on said first hollow shaft and the second gear wheels of the gear trains for first and third speed being carried on said secondary shaft, said change speed gear including a plurality of mechanical clutches so constructed and arranged that only one of said gear trains is capable of transmitting torque at a time, depending on the position of said mechanical clutches, torque bypass means having a first gear wheel, and a second gear wheel engaged by said first gear wheel, a second hollow shaft coaxial of said primary shaft and having a portion interposed between said primary shaft and said first hollow shaft, said second hollow shaft being connected to said second blade wheel of said hydraulic clutch for rotation therewith, said first gear wheel of said torque bypass means being carried on said second hollow shaft, means constructed and arranged to connect said first gear wheel of said bypass means to said second hollow shaft for rotation therewith, said second gear wheel of said bypass means being connected to said secondary shaft for rotation therewith, said torque bypass means being placed next to said drive gear, said change speed gear being placed next to said bypass means, and said hydraulic clutch being placed between said change speed gear and said torque converter.

6. A change speed transmission as defined in claim 5 wherein the second gear wheel of one of said gear trains for first and third speed is fast on said secondary shaft for rotation therewith and the second gear wheel of the other of said gear trains for first and third speed is rotatable on said secondary shaft, the first gear wheel meshing with the gear wheel which is rotatable on said secondary shaft being fast on said first hollow shaft and the first gear wheel meshing with the gear wheel which is fast on said secondary shaft is rotatable on said first hollow shaft.

7. A change speed transmission as defined in claim 5 wherein said mechanical clutches are in the form of double claw clutches whose claws have rejecting faces inclined in one direction of rotation of the clutches, one of said clutches being carried on said first hollow shaft and interposed between the first gear wheels of the gear train for second speed and of one of the other two gear trains, a second of said clutches being carried on said secondary shaft and interposed between the second gear wheel of the gear train for second speed and the second gear wheel of the second of the other two gear trains.

8. A hydromechanical change speed transmission particularly for diesel engine powered rail vehicles comprising, in combination:

a drive gear at one side of the transmission, a hydraulic torque converter and a hydraulic clutch operatively connected to said torque converter and forming a unit therewith placed on the opposite side of the transmission, said torque converter and said hydraulic clutch being capable of being filled with and relieved from an operating fluid, said torque converter including a pump wheel and a turbine wheel, said hydraulic clutch including a rotatable housing forming a first blade wheel and being connected for rotation with said turbine wheel, and a second blade wheel, a primary shaft extending through the transmission and operatively connecting said drive gear to said pump wheel for driving said pump wheel, a first hollow shaft coaxial of said primary shaft and connected to said first blade wheel for rotation therewith, speed change gear maens having a plurality of gear trains, said gear trains each having first and second gear wheels, said first gear wheels of said gear trains being carried on said first hollow shaft, said speed change gear means including a plurality of mechanical clutches so constructed and arranged that only one of said gear trains is capable of transmitting torque at a time, depending on the position of said mechanical clutches, torque bypass means having a first gear wheel and a second gear wheel engaged by said first gear wheel, a second hollow shaft coaxial of said primary shaft and having a portion interposed between said primary shaft and said first hollow shaft, said second hollow shaft being connected to said second blade wheel of said hydraulic clutch for rotation therewith, said first gear wheel of said torque bypass means being carried on said second hollow shaft, means constructed and arranged to connect said first gear wheel of said bypass means to said second hollow shaft for rotation therewith, a secondary shaft placed parallel to said primary shaft and carrying the second gear wheels of said plurality of gear trains, said second gear wheel of said bypass means being connected to said secondary shaft for rotation therewith, said torque bypass means being placed next to said drive gear, said speed change gear means being placed next to said bypass means, and said hydraulic clutch being placed between said speed change gear means and said torque converter, and a reversing gear including a first directional shaft formed as an extension of said secondary shaft, a second directional shaft parallel to said first directional shaft, and a directional gear wheel mounted on each of said directional shafts, said directional gear wheels meshing with each other to rotate said second directional shaft in opposite direction to said first directional shaft.

9. A hydromechanical change speed transmission according to claim 8 including a gear wheel rotatable on said first directional shaft, a gear wheel rotatable on said second directional shaft, a driven shaft, a gear wheel fast on said driven shaft, said gear wheels rotatable on said first and on said second directional shaft meshing with the gear wheel on said driven shaft, a clutch interposed between said gear wheel rotatable on said first directional shaft and said first directional shaft, and a clutch interposed between said gear wheel rotatable on said second directional shaft and said second directional shaft, for selectively driving said gear wheel fast on said driven shaft by the gear wheel rotatable on one or on the other of said directional shafts.

10. A hydromechanical change speed transmission according to claim 9 wherein the transmission ratio through said directional gear wheels combined with the transmission ratio through the gear wheel rotatable on said second directional shaft and the gear wheel fast on said driven shaft is substantially equal to the transmission ratio of the gear wheel rotatable on said first directional shaft and the gear wheel fast on said driven shaft.

11. A hydromechanical change speed transmission according to claim 9 wherein the diameters of said directional gear wheels are equal.

12. A hydromechanical change speed transmission according to claim 9 wherein the diameters of said directional gear wheels are different.

13. A hydromechanical change speed transmission according to claim 9 wherein the directional gear wheel mounted on said first directional shaft is the second gear wheel of one of said gear trains.

14. A hydromechanical change speed transmission according to claim 9 wherein the gear wheel mounted on said first directional shaft is the second gear wheel of said torque bypass means.

15. A hydromechanical change speed transmission according to claim 9 wherein said shafts are substantially horizontal, and said drive gear, said gears rotatable on said directional shafts, and said gear wheel fast on said driven shaft are placed substantially in the same vertical transverse plane of the transmission.

16. A hydromechanical change speed transmission according to claim 15 wherein
said drive gear includes a drive shaft,
said drive shaft, said primary shaft, and said secondary shaft are placed substantially in the same vertical longitudinal plane of the transmission,
and said secondary shaft and said second directional shaft are placed in a horizontal plane.

17. A hydromechanical change speed transmission particularly for diesel engine powered rail vehicles comprising, in combination:
a drive gear at one side of the transmission,
a hydraulic torque converter, a hydraulic clutch and brake operatively connected to said torque converter and forming a unit therewith placed on the opposite side of the transmission,
said torque converter, said hydraulic clutch and brake being capable of being filled with and relieved from an operating fluid,
said torque converter including a pump wheel and a turbine wheel,
said hydraulic clutch including a rotatable housing forming a first blade wheel and being connected for rotation with said turbine wheel, and a second blade wheel,
said hydraulic brake including a stationary casing surrounding said housing of said hydraulic clutch, said casing being provided with internal blades, and said housing being provided with external blades,
a primary shaft extending through the transmission and operatively connecting said drive gear to said pump wheel for driving said pump wheel,
a first hollow shaft coaxial of said primary shaft and connected to said first blade wheel for rotation therewith,
speed change gear means having a plurality of gear trains,
said gear trains each having first and second gear wheels,
said first gear wheels of said gear trains being carried on said first hollow shaft,
said speed change gear means including a plurality of mechanical clutches so constructed and arranged that only one of said gear trains is capable of transmitting torque at a time, depending on the position of said mechanical clutches,
torque bypass means having a first gear wheel, and a second gear wheel engaged by said first gear wheel,
a second hollow shaft coaxial of said primary shaft and having a portion interposed between said primary shaft and said first hollow shaft,
said second hollow shaft being connected to said second blade wheel of said hydraulic clutch for rotation therewith,
said first gear wheel of said torque bypass means being carried on said second hollow shaft,
means constructed and arranged to connect said first gear wheel of said bypass means to said second hollow shaft for rotation therewith,
and a secondary shaft placed parallel to said primary shaft and carrying the second gear wheels of said plurality of gear trains,
said second gear wheel of said bypass means being conected to said secondary shaft for rotation therewith,
said torque bypass means being placed next to said drive gear, said speed change gear means being placed next to said bypass means, and said hydraulic clutch being placed between said speed change gear means and said torque converter.

References Cited by the Examiner
UNITED STATES PATENTS

| | | | |
|---|---|---|---|
| 2,897,690 | 8/59 | Maier | 74—730 |
| 3,016,768 | 1/62 | De Lorean | 74—732 |

DON A. WAITE, *Primary Examiner.*